Figure 1:
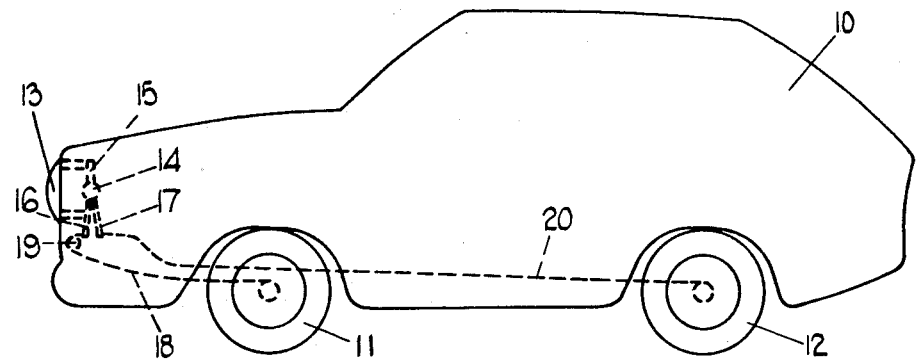

United States Patent [19]
Martin

[11] 4,066,886
[45] Jan. 3, 1978

[54] MOTOR VEHICLE WITH HEADLAMP TILTING MECHANISM

[75] Inventor: Frederick Raymond Patrick Martin, Bromley, England

[73] Assignee: The Lucas Electrical Company Limited, Birmingham, England

[21] Appl. No.: 610,857

[22] Filed: Sept. 5, 1975

[30] Foreign Application Priority Data

Sept. 26, 1974 United Kingdom ............... 41825/74

[51] Int. Cl.² .............................................. B60G 1/10
[52] U.S. Cl. ........................................ 362/68; 362/55
[58] Field of Search .................... 240/7.1 LJ, 61, 61.4, 240/61.6, 61.8, 62.6

[56] References Cited

U.S. PATENT DOCUMENTS

| | | | |
|---|---|---|---|
| 2,105,866 | 1/1938 | Sheaffer | 240/7.1 LJ |
| 2,984,737 | 5/1961 | Marcellus | 240/7.1 LJ |
| 3,316,397 | 4/1967 | Yssel | 240/7.1 LJ |
| 3,697,741 | 10/1972 | Yssel | 240/7.1 LJ |
| 3,808,417 | 4/1974 | Martin | 240/7.1 LJ |
| 3,868,500 | 2/1975 | Martin | 240/7.1 LJ |

FOREIGN PATENT DOCUMENTS 1,164,777 9/1969 United Kingdom ............ 240/7.1 LJ Primary Examiner—L. T. Hix
Assistant Examiner—Alan Mathews
Attorney, Agent, or Firm—Holman & Stern

[57] ABSTRACT

A headlamp tilting mechanism in a motor vehicle comprises a pair of spring arms mounted in opposition on a shaft which is pivotable relative to the motor vehicle body and which carries a pair of headlamps. One end of each spring arm has attached thereto one end of a sleeved cable. One cable is attached to an unsprung part at the rear of the vehicle and the other cable is attached to an unsprung part at the front of the vehicle. Both cable sleeves abut against the underside of the vehicle body. Changes in the attitude of the vehicle body relative to the front and rear wheels cause changes in the tension of the cables to effect biasing of the spring arms so that a resultant rotation of shaft is effected which corresponds to the change in attitude of the vehicle body.

4 Claims, 2 Drawing Figures

MOTOR VEHICLE WITH HEADLAMP TILTING MECHANISM

This invention relates to a motor vehicle with a headlamp tilting mechanism.

According to the present invention, there is provided, in a motor vehicle having a body, front and rear wheels upon which the body is suspended and, a headlamp mounted on the body for tilting movement, a headlamp tilting mechanism comprising a first element movable in response to changes in the attitude of the vehicle body relative to the front wheels, a second element movable in response to changes in the attitude of the vehicle body relative to the rear wheels, a rotatable shaft operably connected with the headlamp, a first spring arm secured at one end to the shaft and attached at its other end to the first element, and a second spring arm attached at one end to the shaft and at its other end to the second element, the arrangement being such that the first and second spring arms are biased by the respective first and second members to act in opposition on the shaft.

Conveniently, the headlamp is mounted on the shaft.

The shaft may also be operably connected with a further headlamp.

Figure 2:
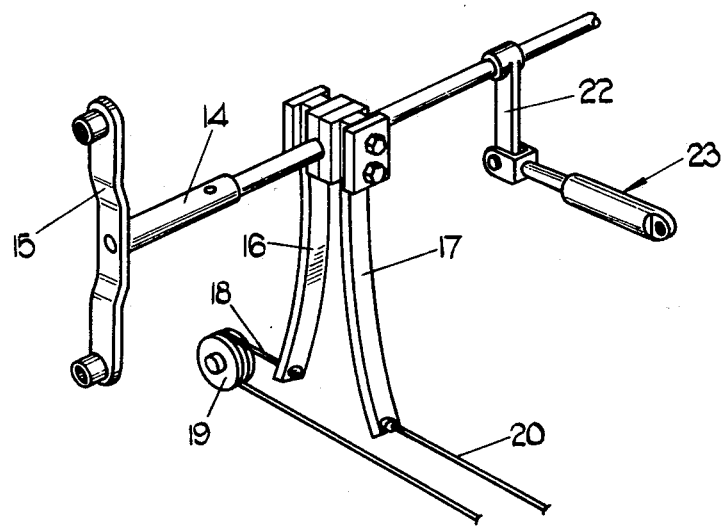

An embodiment of the present invention will now be described, by way of example, with reference to the accompanying drawing, in which:

FIG. 1 is a schematic side view of a motor vehicle including a headlamp tilting mechanism according to the present invention, and FIG. 2 is a schematic view of part of the headlamp tilting mechanism shown in FIG. 1.

Referring to the drawing, the motor vehicle comprises a body 10 suspended on front wheels 11 and rear wheels 12, a pair of headlamps 13 (only one shown) are mounted on a common shaft 14 through the intermediary of levers 15 (only one shown). The shaft 14 extends transversely of the body 10, is horizontally disposed and is angularly movable relative to the body 10. Secured to the shaft 14 intermediate its ends are the ends of first and second spring arms 16 and 17. The first spring arm 16 has secured to its free end, one end of a cable 18 which passes around a pulley 19 rotatable relative to the body 10, and is secured at its other end to an unsprung part of the motor vehicle associated with the front wheels 11. The cable 18 runs in an outer sleeve (not shown) which abuts against a sprung part of the vehicle, in this embodiment an underside part of the vehicle body 10. The arrangement of cable 18 and outer sleeve is such that relative movements between the front wheels 11 and the front of the vehicle body 10 cause changes in the effective length of the cable 18. If the front of the vehicle body 10 moves downwardly relative to the front wheels 11, the effective length of cable 18 is shortened, and vice versa.

A cable 20 is secured to the free end of second spring arm 17 and extends to an unsprung part of the motor vehicle associated with rear wheels 12, in this embodiment a rear axle housing (not shown). The cable 20 runs in an outer sleeve (not shown) which abuts against the underside of the rear of the vehicle body 10. If a load on the rear of the vehicle body 10 is increased, the rear of the vehicle body 10 moves downwardly relative to the wheels 12 and causes a decrease in the effective length of cable 20. If the load on the rear of the vehicle body 10 is lightened, the effective length of cable 20 is increased.

Also mounted on the shaft 14 is an arm 22 to which is secured one end of a damper 23 whose opposite end is pivotally secured relative to the body 10. The damper 23 is of a type which opposes relatively short term movements of arm 22, but permits relatively long term movements thereof.

In use, the cables 18 and 20 are maintained in tension so that first and second spring arms 16 and 17 are also maintained in tension. An equilibrium is established whereby the shaft 14 adopts a position in which the tensions in spring arms 16 and 17 is equalised, spring arms 16 and 17 being of equal strength. With the spring arms 16 and 17 in equilibrium, the headlamps 13 can be set up by manual adjustment means known per se (not shown) to project beams at the required level. If the rear of the vehicle body 10 is loaded, the tension in cable 20 increases because of the decrease in the effective length thereof, thus increasing the tension in spring arm 17. This upsets the equilibrium between first and second spring arms 16 and 17 and the equilibrium is re-established by anti-clockwise rotation of shaft 14, as viewed in FIG. 1, until the equilibrium is re-established. This causes a downward dipping of headlamps 13 to compensate for the change in the attitude of the vehicle body. If the motor vehicle body is loaded equally front and rear, then the same tension is applied to spring arms 16 and 17 via respective cables 18 and 20, with the result that no rotation of shaft 14 occurs. Any imbalance between the loading of the front and the rear of the vehicle body 10 results in an upset in the equilibrium between springs 16 and 17, and the equilibrium is re-established by appropriate movement of shaft 14, which results in a tilting of the headlamps 13. Thus, the spring arms 16 and 17 algebraically sum the signals from the front and rear of the vehicle body 10 and cause an appropriate rotation of shaft 14. The result of this algebraic sum is to maintain the beans projected by the headlamps 13, in use, at the desired level irrespective of the load carried by the motor vehicle body 10 and the distribution thereof.

When the load carried by the motor vehicle body 10 is lightened, the tension in either or both of cables 18 and 20 is lessened, depending upon the distribution of the load in the body 10, and appropriate rotation of shaft 14 occurs to provide a compensating tilt of headlamps 13.

If the motor vehicle is subjected to deceleration forces, such as by application of the brakes of the motor vehicle, the front of the body 10 dips and changes the equilibrium established between the spring arms 16 and 17 to cause an upward tilting of headlamps 13 to compensate for the dipping of the front of the vehicle body 10. Conversely, if the motor vehicle is accelerated, the front of the body 10 lifts to effect a downward tilting of headlamps 13 to compensate for lifting of the front of the vehicle body 10 under the acceleration forces.

The damper 23 serves to prevent fluttering of the headlamps 13 when a motor vehicle is being driven over a rough road and wheel bounce occurs.

I claim:

1. In a motor vehicle having a vehicle body, front and rear wheels upon which the body is suspended and a headlamp mounted on said body for upward or downward tilting movement, a headlamp tilting mechanism comprising a first element movable in response to changes in the attitude of said vehicle body relative to said front wheels, a second element movable in response to changes in the attitude of said vehicle body relative to said rear wheels, a rotatable shaft operably connected with said headlamp, a first blade spring arm connected at one of its ends to said shaft and attached at the other of its ends to said first element, and a second blade spring arm attached at one of its ends to said shaft and at the other of its ends to said second element, the arrangement being such that said first and second blade spring arms are normally biased by respective ones of said first and second members and act in opposition to each other on said shaft, said blade spring arms causing the shaft to rotate in either one direction or the other to cause the headlamp to tilt up or down in response to changing attitudes of said vehicle body.

2. The headlamp tilting system according to claim 1, wherein said headlamp is mounted on said shaft.

3. The headlamp tilting system according to claim 1, wherein said shaft is also operably connected with a further headlamp.

4. The headlamp tilting system according to claim 1, wherein each of said elements is a cable.

* * * * *